(12) United States Patent
Kordas et al.

(10) Patent No.: US 10,215,659 B2
(45) Date of Patent: Feb. 26, 2019

(54) METHOD AND APPARATUS FOR LEAK DETECTION

(71) Applicant: Delphi Automotive Systems Luxembourg SA, Bascharage (LU)

(72) Inventors: Grzegorz Kordas, Wieliczka (PL); Dominik Mirocha, Lencze (PL); Maciej Bojkowski, Cracow (PL)

(73) Assignee: DELPHI AUTOMOTIVE SYSTEMS LUXEMBOURG SA, Bascharage (LU)

( * ) Notice: Subject to any disclaimer, the term of this patent is extended or adjusted under 35 U.S.C. 154(b) by 45 days.

(21) Appl. No.: 15/420,795

(22) Filed: Jan. 31, 2017

(65) Prior Publication Data

US 2017/0219456 A1 Aug. 3, 2017

(51) Int. Cl.
*G01M 3/02* (2006.01)
*G01M 3/32* (2006.01)
*F02M 37/00* (2006.01)
*F02M 65/00* (2006.01)

(52) U.S. Cl.
CPC ...... *G01M 3/3209* (2013.01); *F02M 37/0047* (2013.01); *F02M 65/006* (2013.01); *G01M 3/025* (2013.01); *G01M 3/3272* (2013.01)

(58) Field of Classification Search
CPC .............. G01M 3/3209; G01M 3/3272; F02M 37/0047; F02M 65/006
See application file for complete search history.

(56) References Cited

U.S. PATENT DOCUMENTS

| 6,964,193 | B2 | 11/2005 | Kobayashi et al. | |
|---|---|---|---|---|
| 2003/0131655 | A1* | 7/2003 | Miyahara | F02M 25/0818 73/37 |
| 2005/0044937 | A1* | 3/2005 | Kobayashi | F02M 25/0809 73/114.41 |
| 2009/0266147 | A1 | 10/2009 | Denso | |
| 2015/0198123 | A1 | 7/2015 | Pearce et al. | |
| 2015/0226630 | A1 | 8/2015 | Nakagawa | |

FOREIGN PATENT DOCUMENTS

JP 2004156492 A 6/2004

* cited by examiner

*Primary Examiner* — Paul M. West
(74) *Attorney, Agent, or Firm* — Joshua M. Haines

(57) ABSTRACT

An apparatus to detect fluid sealing of fuel tank includes a flow inlet and a flow outlet. The apparatus also includes a first flow path, fluidly connected between the flow inlet and the flow outlet, where the first flow path includes a fluid pump which pressurizes fluid from the flow inlet, the first flow path including an on-off valve to allow flow from the flow inlet to the flow outlet, the first flow path including a pressure sensor, and a flow control orifice located in the first flow path between the check valve and the flow outlet. The apparatus also includes a second flow path fluidly connected between the flow inlet and the flow outlet, the second flow path including an on/off valve located therein.

8 Claims, 6 Drawing Sheets

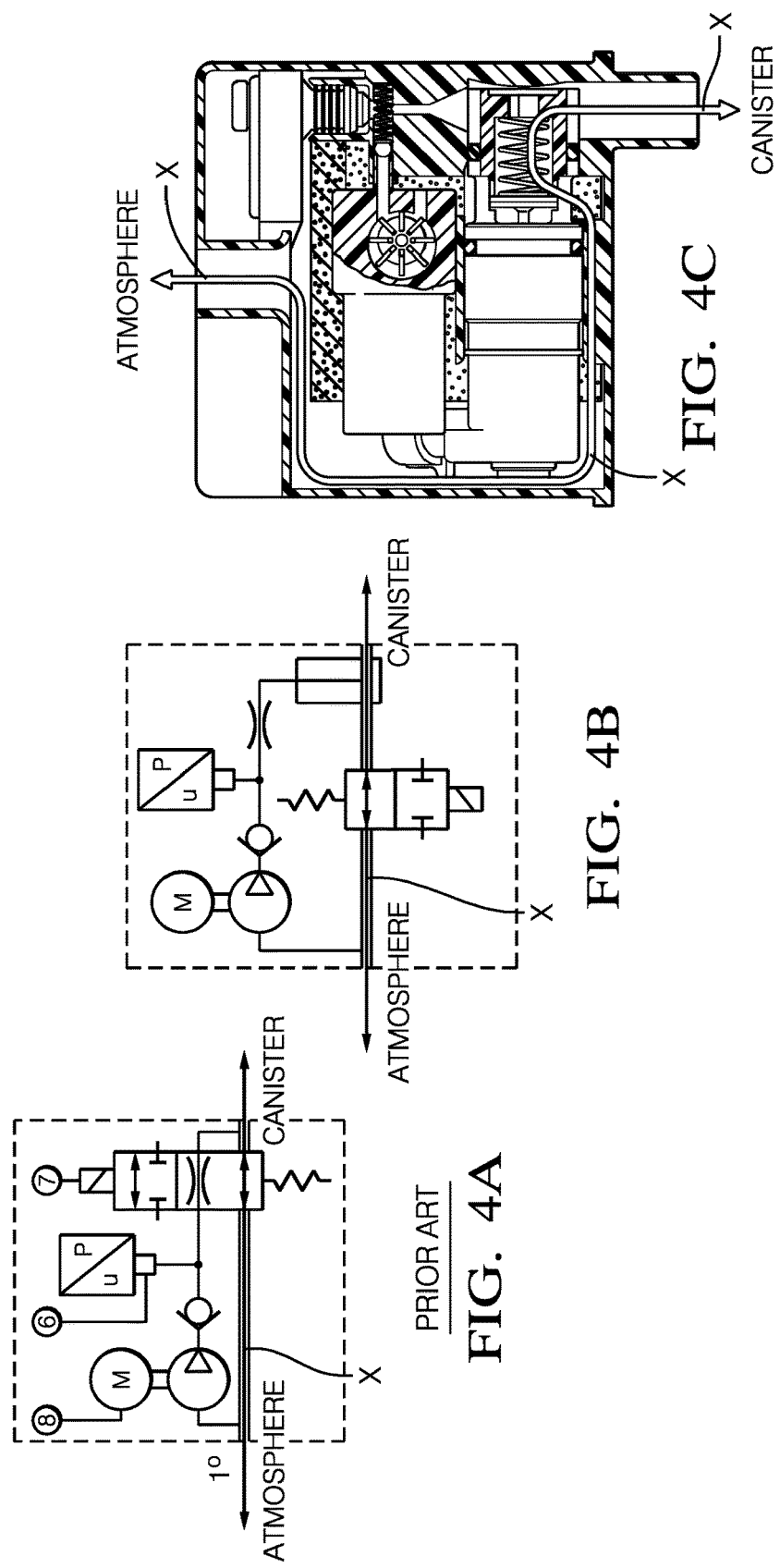

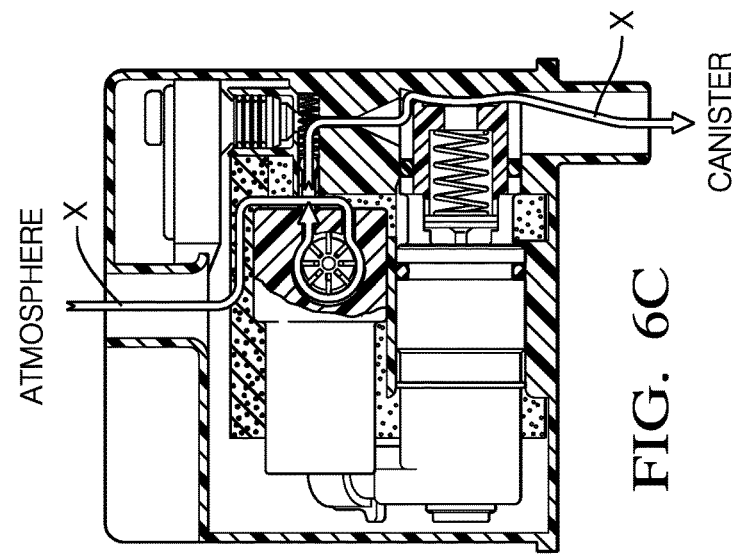
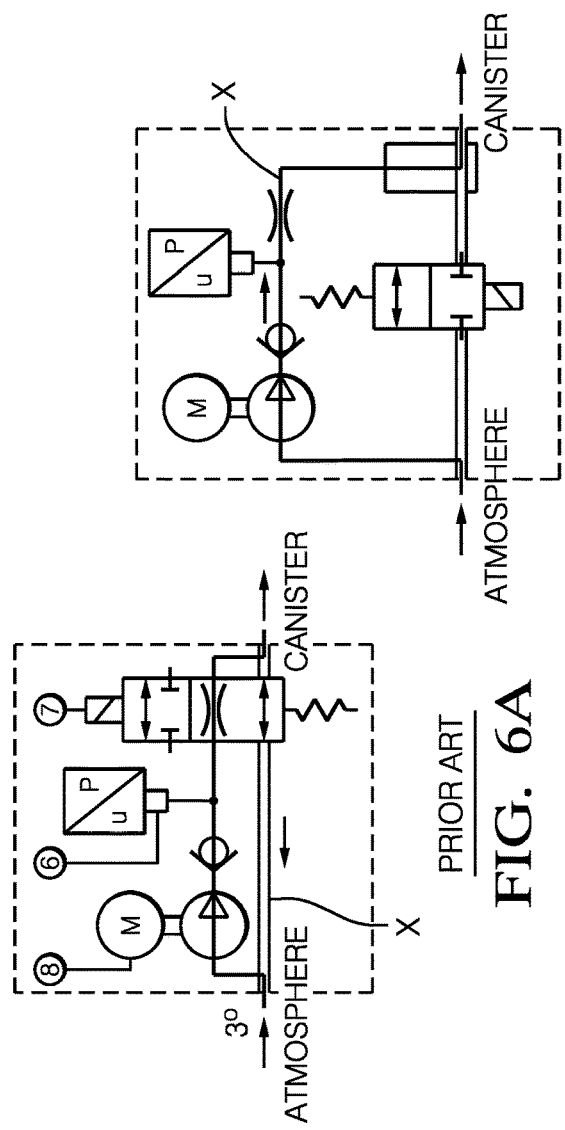
FIG. 6A PRIOR ART
FIG. 6B
FIG. 6C

METHOD AND APPARATUS FOR LEAK DETECTION

CROSS REFERENCE TO RELATED APPLICATIONS

This patent application claims the benefit of GB Patent Application No. 1601738.6 filed on Feb. 1, 2016, the entire disclosure of which is hereby incorporated by reference in its entirety.

TECHNICAL FIELD OF INVENTION

This disclosure relates to an apparatus and method to detect leaks in systems such as nominal enclosed (i.e. sealed) systems. It has particular but not exclusive application to determining air tightness/leaks in fuel tanks e.g. of vehicles.

BACKGROUND OF INVENTION

In current tank and evaporative emission control systems on gasoline vehicles, the tightness (i.e. detecting the sealing thereof/detecting if the tank is airtight) is determined by leak detection based on two general methods. Leaks can be detected after pressurizing or applying a vacuum to the tank system. Car manufacturers currently use both techniques.

All these systems have some disadvantages. One of the most important factors which results in these disadvantages is leak detection technique complicity and sensitivity of components. In pressurized systems the components may be sensitive (i.e. not robust) to solid or liquid contamination and environmental conditions. Leak detection by applying vacuum is time consuming and difficult for application in hybrid vehicles. Current leak detection modules are very complicated and have a many close-fitting connections; this not only increases the cost of assembly but also increases the risk of failure, thus compromising the reliability.

It is an object of the invention to provide an improved system. It is a further object of the invention to provide a system and method of leak detection having improved reliability and robustness.

SUMMARY OF THE INVENTION

In one aspect is provided an apparatus to detect fluid sealing of a fuel tank comprising: a flow inlet, a flow outlet, and i) a first flow path, fluidly connected between said flow inlet and said flow outlet, where the first flow path includes a fluid pump adapted to pressurize fluid from said flow inlet, said first flow path including an on-off valve adapted to allow flow from said flow inlet to said flow outlet, said first flow path including pressure sensor, and a flow control orifice located in said first flow path between said check valve and said flow outlet, and ii) a second flow path fluidly connected between said flow inlet and said flow outlet, said second flow path including an on/off valve located therein.

Preferably said pump includes an outlet, said outlet directly fluidly connected to said check valve and adapted to allow flow from said pump outlet to said flow outlet Preferably said pressure sensor is located at a point in said first fluid flow path between said check valve and said orifice.

Preferably said on-off valve is a solenoid operated vent valve.

BRIEF DESCRIPTION OF DRAWINGS

The invention will now be described by way of example and with reference to the following figures of which:

FIGS. 4A, B, C illustrate the purge and refueling steps for the FIGS. 1 to 3 representation;

FIGS. 6A, B, C illustrate the pressure generation mode/step for the FIGS. 1 to 3 representations.

DETAILED DESCRIPTION OF INVENTION

Prior Art

Figure 1:
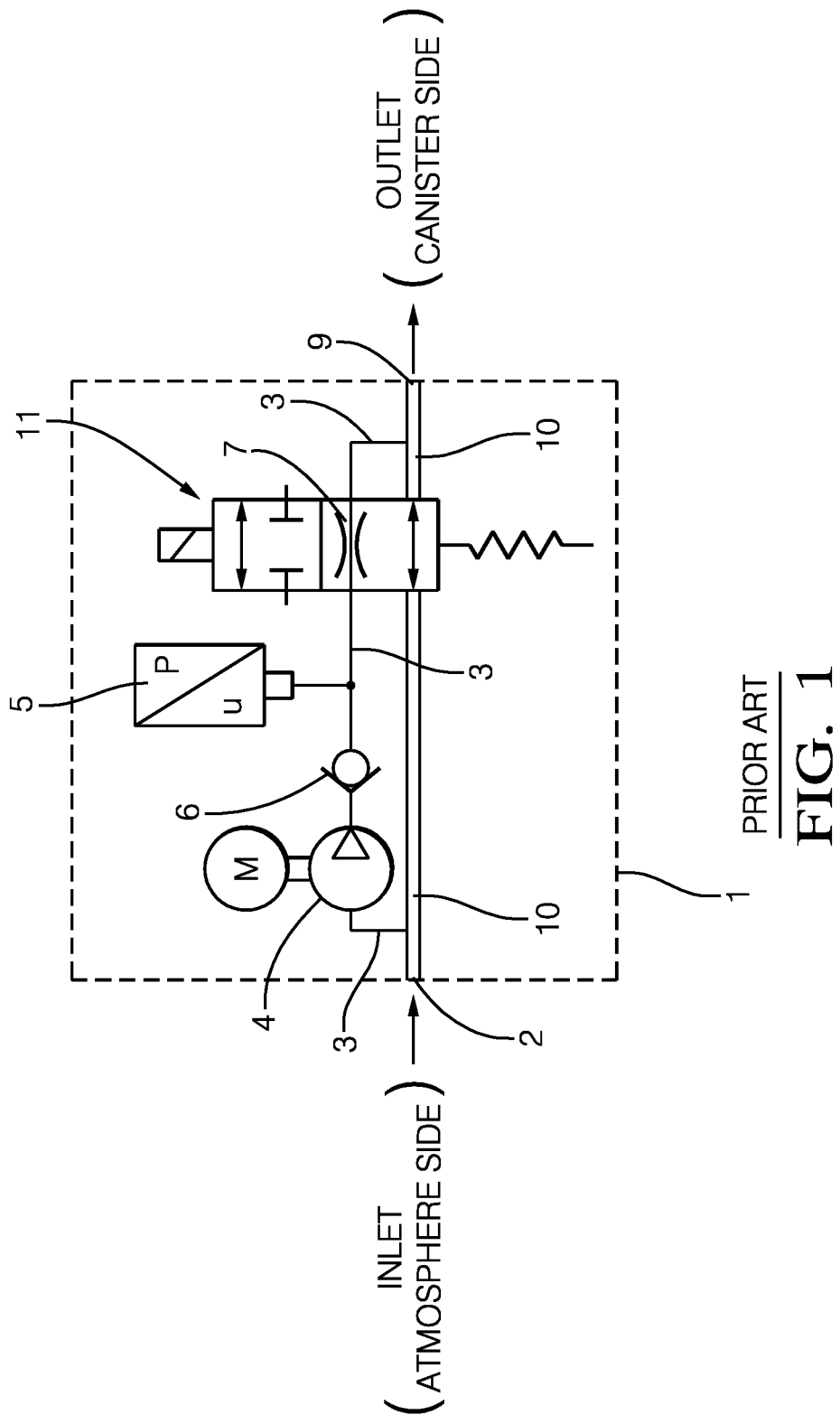
FIG. 1 shows a prior art leak detection system.

FIG. 1 shows a prior art leak detection system 1 often referred to as a tank leak detection module (TLDM) which incorporates four main components as shown. The module includes an inlet 2 and outlet 9 and a first flow path 3 (which could be considered a by-pass flow path). The first flow path fluidly connects the inlet to the outlet via a pump 4, provided to generate pressure inside a (e.g. evaporative) system (such as canister, tank, lines) to be tested. In the first flow path is located a pressure sensor 5, adapted to detect pressure and pressures changes inside (e.g. tank) to be tested. A check valve 6 is provided and adapted to prevent the flow of air back to the pump and thus assist the pressurization of the system to be tested. A further second (main) flow path 10 is provided parallel to the first flow path.

A 2-way switch valve 11 is provided as shown which controls flow in both the first and second flow paths. The 2-way switch valve has two settings which shall be explained in more detail hereinafter.

Flow is allowed through the second flow path in a first setting with limited flow through a restriction/orifice portion 7 in the first flow path. In a second setting, the second flow path is blocked and flow is allowed freely through the first path.

Examples of the Invention

Figure 2:
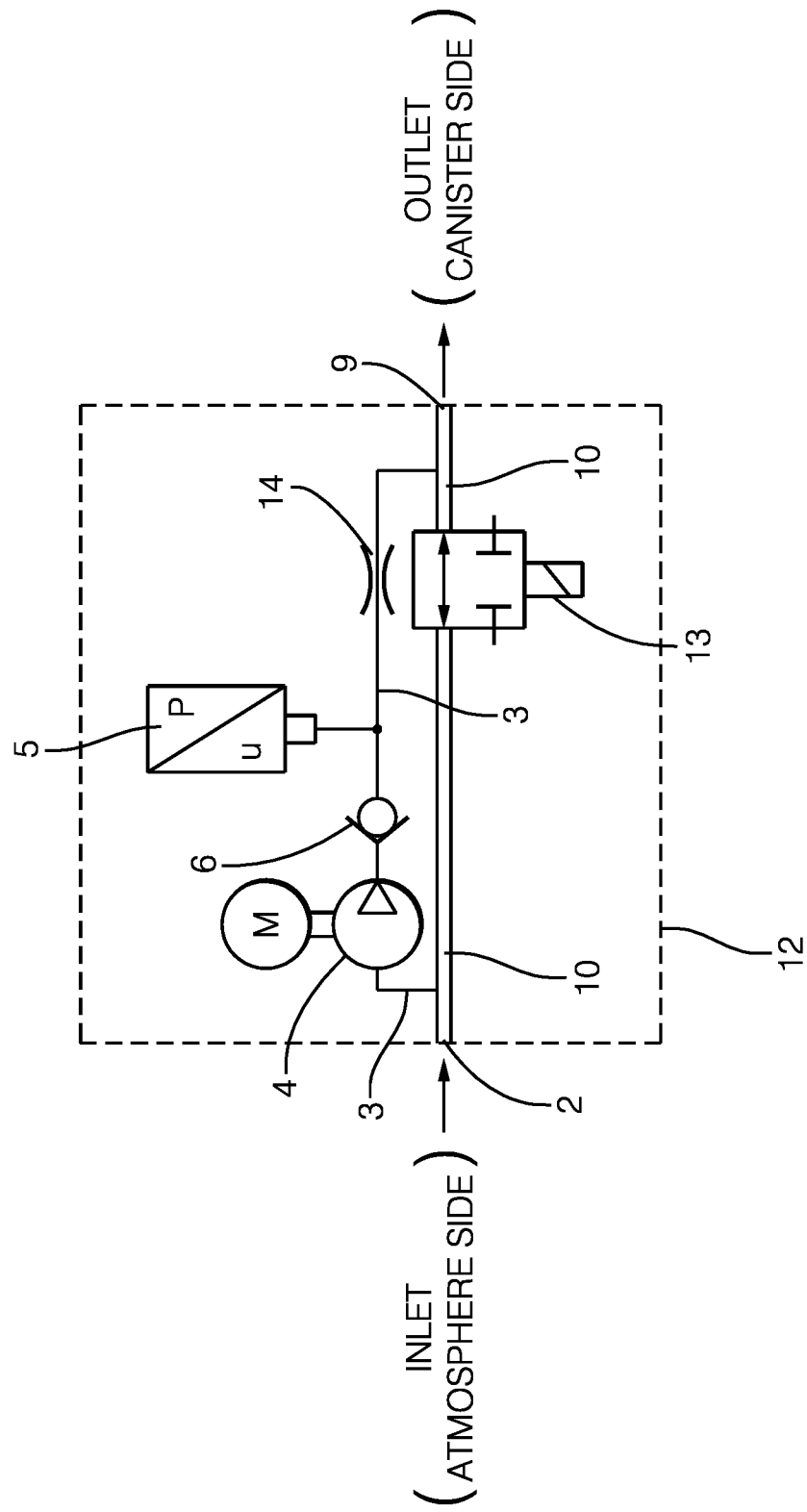
FIG. 2 shows a schematic representation of the invention according to one example.

FIG. 2 shows one example of a leak detection module (TLDM) 12 or system according to one aspect. It has common features with the FIG. 1 modules and common components are designated with the same reference numerals.

The outlet of the pump in the first flow path passes through a simple (e.g. by-pass) circuit including an orifice 14 to the module outlet. The orifice may be in the order of 2 mm diameter and can be considered as a restriction of in the first (bypass) flow path to assist detection of the increase of the pressure when air flow is generated by pump. In this way the (e.g. reference) orifice does not have to be calibrated and contamination of orifice does not have an impact on leak detection functionality. If the orifice is sufficient in size it will not become blocked by dust particles or liquid phase. A check valve 6 may be provided.

In the second flow path is located a simple on-off valve 13 which may e.g. be a solenoid operated valve—also known as vent valve 13. Thus valve 13 has two simple settings, either allowing or blocking flow through the second flow path.

Figure 3:
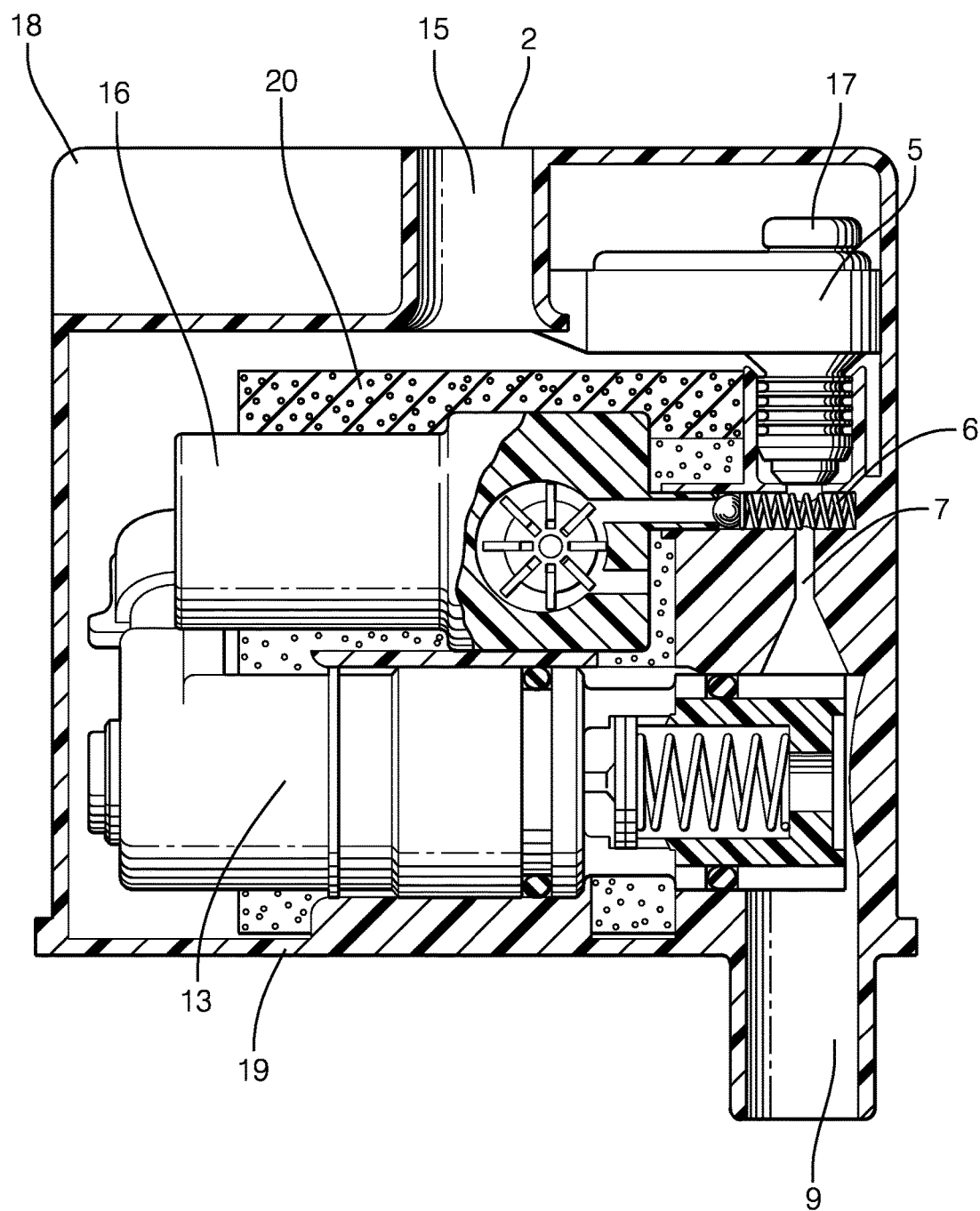
FIG. 3 shows a manifestation design of the representation of the FIG. 2 circuit.

FIG. 3 shows a manifestation design of the representation of the FIG. 2 circuit and includes an inlet forming a tube 15, fluidly connected to a rotary vane pump 16, pressure sensor with atmospheric pressure port 17 as a reference, a check valve 6 including ball and spring arrangement. The on-off valve (solenoid operated valve) is shown. The design includes top and bottom covers 18, 19 and a dust filter 20. The air paths are in this example integrated into one (e.g.

injection moulded) plastic module. The bottom housing may integrate all air flow paths, as well as sockets for installation of components. The top housing provides protection and a connection for an electrical connector. Orifice 7 is shown.

The bottom cover with socket can be integrated by one injection process. The number of vibration decoupling components can be reduced because the module may be decoupled by e.g. the canister bracket decoupling system (e.g. rubber grommets).

The dust filter is preferably integrated inside the module to solve the problem of integration of external dust filter box and reduces the size and number of connections. The dust filter integrated inside acts to provide insulation pump and valve noise. The pressure sensor may be modular and installed inside the module and protected from the environmental (e.g. water) by top housing of module.

FIGS. 4A-C, 5A-C and 6A-C each show a particular operational step in the methodology for leak checking (a canister/tank or other system), for both the prior art design of FIG. 1 and an example according to the FIGS. 2 and 3.

Figure 5C:
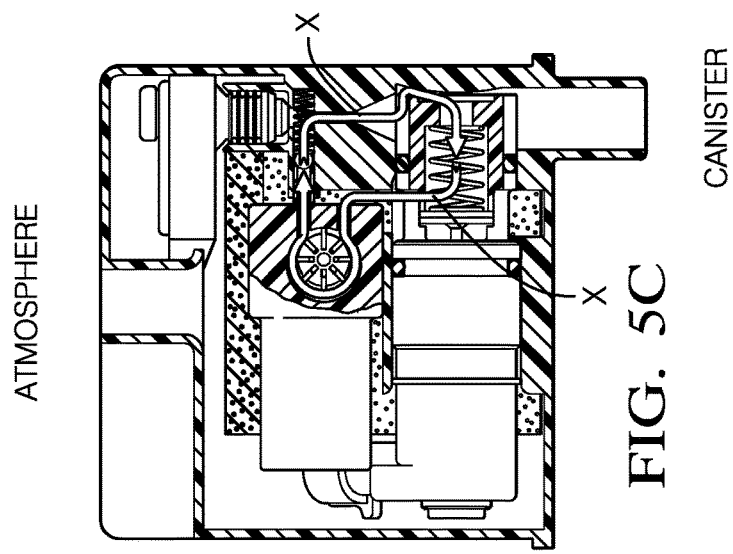
FIGS. 5A, B, C illustrate the module diagnosis step for the FIGS. 1 to 3 representations.
Figure 5B:
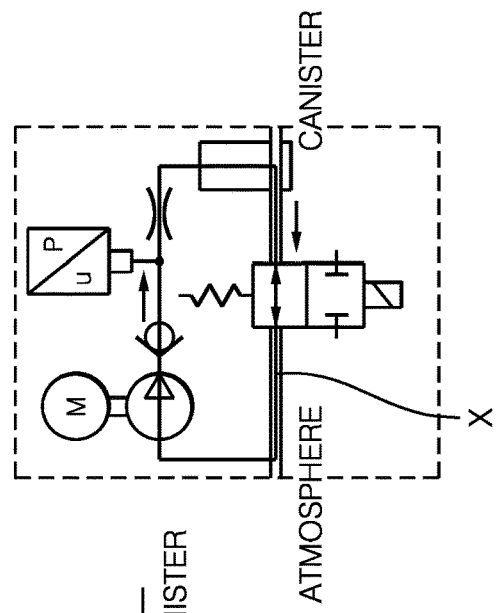
Figure 5A:
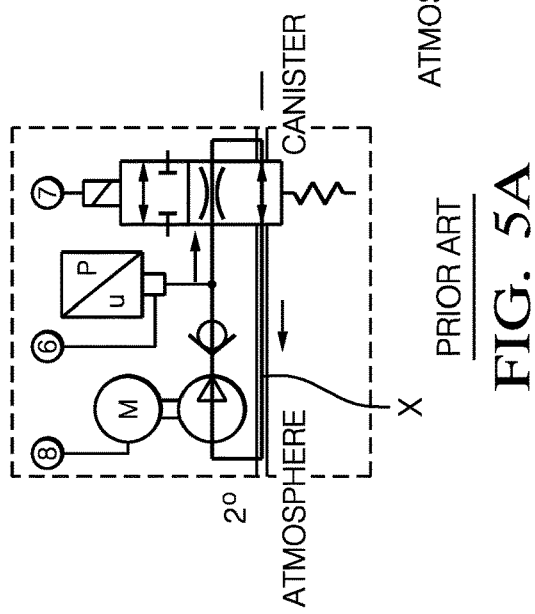

In each of the FIGS. 4A, 5A, 6A on the left hand side of each drawing sheet is shown the prior art design of FIG. 1; FIGS. 4B, 5B, 6B in the centre of each drawing sheet is shown the schematic example of FIG. 2 and FIGS. 4C, 5C, 6C on the right of each drawing sheet shows the actual design of FIG. 3.

FIGS. 4A, B, C show the purge and refueling step for the FIGS. 1, and 3 designs respectively. The flow line X shows the flow to or from the system to be tested, to or from the atmosphere in the prior art system (FIG. 4A) and the system according to one example (FIG. 4B). In this operation the pump is switched off, in FIG. 4B, the change-over valve is set to the first state referred to above; in FIG. 4B and C, the on-off valve is set to allow flow (which can flow to or from the atmosphere to the system (e.g. canister) being tested, as shown by the arrow X in FIGS. 4B and C. Essentially there is no flow in the first flow path (bypass).

FIGS. 5A, B, C show a module diagnosis step for the prior art design and ones according to aspects of the invention. In FIG. 5A regarding the prior art design, the switch valve is off, i.e. in the same position as the above step. The pump is switched on and there is flow through the bypass/restriction in the switch valve of the prior art (FIG. 5A) and the restriction/orifice of the example in FIG. 5B. Back flow is allowed in both FIG. 5A and 5B from the system to be tested/canister to the atmosphere via the switch valve and on-off valve respectively for prior art and designs according to the invention. Flow in the designs of FIGS. 5A, B, C is shown by the arrow X as before.

FIGS. 6A, B, C show pressure generation mode. In the prior art, in FIG. 6A, the switch valve is switched on (i.e. the second setting) where flow in the first path can flow freely i.e. to the canister/system to be tested by pressurization from the pump. Flow in the second path (e.g. from the canister to the atmosphere) is prevented. In FIG. 6B again the pump is on and flow in the second path is prevented by switching the one way valve to the closed position; the canister is pressurized via flow through the first path (by-pass) via orifice/restriction from pump. FIG. 6C shows the actual flow in a design according to one example by the arrow X.

Current examples overcome the main disadvantage of prior art design is the complicity of air flow paths and changeover switch valve. In the prior art the usual position of the changeover switch valve is when main air path is opened to atmosphere and reference orifice is in set on opened position on bypass air path. After energizing of the changeover switch valve the main path is closed, reference orifice is blocked and pump is generating the air flow through bypass air path (e.g. having 4 mm diameter size). With the prior art the problem is with sealing of connections between valve and both main path and bypass air path with reference orifice. Difficult and size consuming is also the integration of dust filtration box with the TLDM. A filter box on the atmosphere side is preferable for reduction of dust contamination impact on module components. Dust from environment may strongly impact the reliability of pump and tightness of. Additionally the ventilation of pressure sensor reference port to the atmosphere may be complicated due to high level of tightness requirements for jet-washing or water immersing.

Accordingly the leak detection module according to examples is simpler in that e.g. it uses an on-off valve e.g. simple solenoid vent such as a canister vent solenoid (CVS) valve in place of more complicated changeover switch valve to reduce the complicity and number of pathways to be closed, provide enhanced robustness.

As presented above the normally opened CVS after energizing will close only one main air path.

The module according to one aspect is characterized in that air ways are reduced and simplified only to two paths and one diagnosis way is required for leak detection. For that bypass path with pressure drop orifice is characterized in that the path is permanently opened for air flow to the canister and the on-off valve will not close the bypass in both working positions. For this e.g. a canister vent solenoid (CVS) may be used but the flow direction and the operation principle can be changed from current sealing of negative pressure to new sealing of positive pressure in canister. For that purpose the pressure in the canister will be positive and on-off (e.g. solenoid vent) valve such as CVS has to be mounted to seal the canister overpressure accordingly. For leak detection purposes, the air pump will generate air flow to the canister and tank by using only one path with reference orifice solves the problem of using more complex change over switch valve.

We claim:

1. An apparatus to detect fluid sealing of a fuel tank comprising:
    a flow inlet, a flow outlet, and
    i) a first flow path, fluidly connected between said flow inlet and said flow outlet, where said first flow path includes a fluid pump adapted to pressurize fluid from said flow inlet, said first flow path including a check valve adapted to allow flow from said flow inlet to said flow outlet, said first flow path including a pressure sensor, and a flow control orifice located in said first flow path between said check valve and said flow outlet, and
    ii) a second flow path fluidly connected between said flow inlet and said flow outlet, said second flow path including an on/off valve located therein such that said on/off valve is moveable between 1) a first position which allows flow between said flow inlet and said flow outlet through said second flow path and 2) a second position which blocks flow between said flow inlet and said flow outlet through said second flow path such that all flow from said flow inlet to said flow outlet passes through said first flow path.

2. An apparatus as claimed in claim 1 wherein said fluid pump includes a pump outlet, said pump outlet directly fluidly connected to said check valve and adapted to allow flow from said pump outlet to said flow outlet.

3. An apparatus as claimed in claim 2 wherein said pressure sensor is located at a point in said first flow path between said check valve and said flow control orifice.

4. An apparatus as claimed in claim 3 wherein said on/off valve is a solenoid operated vent valve.

5. An apparatus as claimed in claim 2 wherein said on/off valve is a solenoid operated vent valve.

6. An apparatus as claimed in claim 1 wherein said pressure sensor is located at a point in said first flow path between said check valve and said flow control orifice.

7. An apparatus as claimed in claim 1 wherein said on/off valve is a solenoid operated vent valve.

8. An apparatus as claimed in claim 1 wherein said second position of said on/off valve blocks flow between said flow inlet and said flow outlet through said second flow path such that all flow from said flow inlet to said flow outlet passes through said flow control orifice.

\* \* \* \* \*